United States Patent
Mansuy et al.

(10) Patent No.: US 11,855,779 B2
(45) Date of Patent: Dec. 26, 2023

(54) METHOD FOR TRANSMITTING A MESSAGE OVER A BROADCAST CHANNEL WITH RETRANSMISSION OVER A POINT-TO-POINT LINK

(71) Applicant: SIGFOX, Labege (FR)

(72) Inventors: Arnaud Mansuy, Toulouse (FR); Juan Carlos Zuniga, Montreal (CA)

(73) Assignee: SIGFOX, Labege (FR)

( * ) Notice: Subject to any disclaimer, the term of this patent is extended or adjusted under 35 U.S.C. 154(b) by 228 days.

(21) Appl. No.: 17/601,059

(22) PCT Filed: Apr. 16, 2020

(86) PCT No.: PCT/EP2020/060703
§ 371 (c)(1),
(2) Date: Oct. 2, 2021

(87) PCT Pub. No.: WO2020/212486
PCT Pub. Date: Oct. 22, 2020

(65) Prior Publication Data
US 2022/0173835 A1     Jun. 2, 2022

(30) Foreign Application Priority Data
Apr. 18, 2019   (FR) ..................... 19 04161

(51) Int. Cl.
*H04L 1/08*    (2006.01)
*H04H 20/16*   (2008.01)

(52) U.S. Cl.
CPC ............... *H04L 1/08* (2013.01); *H04H 20/16* (2013.01)

(58) Field of Classification Search
CPC .................................. H04L 1/08; H04H 20/16
USPC .................................................. 370/310, 312
See application file for complete search history.

(56) References Cited

U.S. PATENT DOCUMENTS

| | | | |
|---|---|---|---|
| 9,307,441 B1 * | 4/2016 | Vivanco | H04W 28/0242 |
| 2012/0140677 A1 | 6/2012 | Choi et al. | |
| 2016/0094356 A1 * | 3/2016 | Xiang | H04L 1/165 370/390 |
| 2018/0227083 A1 | 8/2018 | Choi et al. | |
| 2020/0187232 A1 * | 6/2020 | Maeder | H04W 72/1273 |

FOREIGN PATENT DOCUMENTS

| | | | |
|---|---|---|---|
| EP | 2662993 A2 | 11/2013 | |
| WO | WO-2012035367 A1 * | 3/2012 | H04W 72/005 |

* cited by examiner

*Primary Examiner* — Obaidul Huq
(74) *Attorney, Agent, or Firm* — H&I PARTNERS; C. Andrew Im; Jean-Christophe Hamann

(57) ABSTRACT

A method for transmitting a message via an access network to a group of terminals is provided. The access network transmits the message to the group of terminals over a broadcast channel. The access network receives a request for retransmission of the message transmitted from a terminal that has not correctly received the message. The access network evaluates a predetermined broadcast retransmission criterion and retransmits the message over a point-to-point link or over a broadcast channel according to the predetermined broadcast retransmission criterion.

8 Claims, 2 Drawing Sheets

METHOD FOR TRANSMITTING A MESSAGE OVER A BROADCAST CHANNEL WITH RETRANSMISSION OVER A POINT-TO-POINT LINK

RELATED APPLICATIONS

This application is a § 371 application of PCT/EP2020/060703 filed Apr. 16, 2020, which claims priority from French Patent Application No. 19 04161 filed Apr. 18, 2019, each of which is incorporated herein by reference in its entirety.

TECHNICAL FIELD

The present invention belongs to the field of wireless communication systems, and relates more particularly to a method for transmitting, by an access network, a message to a group of terminals.

BACKGROUND OF THE INVENTION

The present invention finds a particularly advantageous application, although in no way limiting, for wireless communication systems implemented for applications of the M2M (acronym for "Machine-to-Machine") type or of the "Internet of Things" (or IoT) type.

In such wireless communication systems, message exchanges are essentially one-way, in this case over an uplink between terminals and an access network of said system.

The terminals transmit messages on the uplink which are collected by base stations of the access network, preferably without having to first associate with one or more base stations of the access network. In other words, the messages transmitted by a terminal on the uplink are not intended for a specific base station of the access network, and the terminal transmits its messages assuming that they can be received by at least one base station. Such arrangements are advantageous in that the terminal does not need to carry out regular measurements, particularly demanding from a power consumption point of view, to determine the most suitable base station for receiving its messages. The complexity lies in the access network, which must be able to receive uplink messages that can be transmitted at arbitrary times and on arbitrary central frequencies.

Such an operating mode, wherein the exchanges of messages are essentially one-way, is entirely satisfactory for many applications, such as, for example, remote reading of gas, water and electricity meters, remote monitoring of buildings or houses, etc.

In some applications, however, it may be advantageous to be able to also perform message exchanges in the other direction, namely on a downlink from the access network to the terminals.

In particular, it may be advantageous to transmit messages over a global broadcast or multicast channel to the terminals. In particular, the transmission of messages over a broadcast channel can be implemented to perform software updates used by a group of terminals, the group of terminals can be all the terminals (global broadcast channel) or else only part of said terminals (multicast channel).

However, it is not uncommon for some messages, transmitted over a broadcast channel, not to be correctly received by one or more terminals. In such a case, in particular in the case of messages transmitted in a software update context, it is necessary to retransmit the messages which were not correctly received.

In a wireless communication system for M2M and/or IoT applications, the power consumption of the terminals must often be reduced as much as possible, especially when they are operated on battery. Consequently, it may be desirable in some cases to allow a terminal to receive a retransmitted message while limiting the impact on its power consumption.

In such a wireless communication system, it is also not uncommon to implement base stations of the half-duplex type, in order to limit the manufacturing cost of said base stations, and more generally of the access network. However, a base station which transmits a message over a broadcast channel on the downlink is not available to receive messages transmitted on the uplink. Consequently, it may be desirable in some cases to allow the retransmission of messages on the downlink, while limiting the downtime for receiving messages on the uplink.

OBJECT AND SUMMARY OF THE INVENTION

The objective of the present invention is to overcome all or part of the limitations of the solutions of the prior art, in particular those set out above.

To this end, and according to a first aspect, the invention relates to a method for transmitting a message by an access network to a group of terminals, including:
- transmitting, by the access network, at least one message to a group of terminals over a broadcast channel,
- receiving, by said access network, a request for retransmission of said message transmitted by a terminal that has not correctly received said message,
- evaluating, by the access network, a predetermined broadcast retransmission criterion for,
- when said broadcast retransmission criterion is verified: retransmitting the message, by the access network, over a broadcast channel to the group of terminals including said terminal having transmitted said request for retransmission of said message,
- when the broadcast retransmission criterion is not verified: retransmitting the message, by the access network, over a point-to-point link to said terminal having transmitted said request for retransmission.

The broadcast retransmission criterion is evaluated based on at least one of the following parameters:
- a number of messages to be retransmitted to one or more terminals of the group,
- a total size of messages to be retransmitted to one or more terminals of the group,
- a capacity of broadcast channels planned by the access network.

A message transmitted on the broadcast channel is transmitted by the access network to all the terminals of the group. On the other hand, a message transmitted over a point-to-point link between the access network and a terminal is transmitted only to said terminal.

Thus, when a message transmitted over a broadcast channel, to a group of terminals, is not correctly received by a terminal of said group, then this message can be retransmitted to this terminal over a point-to-point link.

Consequently, since the message is not then retransmitted over a broadcast channel, this message can be retransmitted without impacting the power consumption of other terminals which have correctly received this message. Indeed, if this message were retransmitted over a broadcast channel, then this would increase the duration of the broadcast channel, and the corresponding time of listening to said broadcast channel by the other terminals, to again receive a message that said other terminals had already received.

In general, this can therefore reduce the duration of use of the broadcast channel since it is possible to use the broadcast channel only for transmissions of the various messages forming, for example, the software update of the terminals, the retransmissions being made through point-to-point links. Thus, all the messages forming the software update can be quickly broadcast to the group of terminals, any retransmissions can be made through point-to-point links.

Furthermore, by performing a retransmission over a point-to-point link, it can also allow to facilitate the planning of the retransmission and to reduce the power consumption of the terminal having transmitted the request for retransmission, compared to a retransmission on a transmission channel. Indeed, a broadcast channel in principle needs to be planned and cannot be planned at any time, because the terminals of the group must be informed of the existence of a broadcast channel including one or more messages intended for the group of terminals to which they belong. Conversely, a retransmission of the message over a point-to-point link is much simpler to achieve. For example, it is possible to retransmit the message upon receiving the request for retransmission. If necessary, the terminal simply needs to listen to the downlink immediately after having transmitted the request for retransmission, which allows to reduce the listening time of the downlink.

It should be noted that if the method according to the invention includes a retransmission, by the access network, of a message over a point-to-point link to a terminal, this in no way prevents the possibility for said method of also including a retransmission of a message over a broadcast channel to a group of terminals. The choice to retransmit over a point-to-point link or over a broadcast channel may in particular depend on a criterion evaluated by the access network.

Thus, the access network can choose, depending on a broadcast retransmission criterion, between:
retransmitting a given message over a point-to-point link, and
retransmitting this message over a broadcast channel.

As noted above, the retransmission over a point-to-point link can have many advantages. However, in some cases, it may also be advantageous to retransmit the message over a broadcast channel.

For example, if the same message has not been correctly received by several terminals and must be retransmitted by the same base station, then it may be advantageous to retransmit this message over a broadcast channel in order to reduce the downtime of said base station in reception. Indeed, it is then faster to retransmit this message only once over a broadcasting channel rather than to retransmit it several times on respective point-to-point links to the terminals which have transmitted a request for retransmission for this message.

Furthermore, when different messages are not received by different terminals, a retransmission of these different messages over a broadcast channel allows to limit the amount of control data compared to the amount of useful data included in the retransmitted messages. For example, over a broadcast channel, only one recipient is specified for all retransmitted messages. For a retransmission by point-to-point links, there are as many recipients as there are point-to-point links, so that the amount of control data represented by the identifiers of the recipients is greater than in the case of a retransmission of messages over a broadcast channel.

More generally, the fact of being able to choose, in the context of a transmission over a broadcast channel, between a retransmission over a broadcast channel or a retransmission over a point-to-point link offers great flexibility to optimise the operation of the wireless communication system. For example, it is possible, depending on the case, to favour a reduction in the power consumption of the terminals, to favour a reduction in the downtime of the base stations in reception, to favour a reduction in the transmission time of the set of messages forming a software update, etc.

"A number of messages to be retransmitted to one or more terminals of the group" means for example the total number of messages to be retransmitted (that is to say the sum of the numbers of messages to be retransmitted to each of the terminals of the group), the number of different messages to be retransmitted (regardless of whether they are to be retransmitted to different terminals or not), or else the number of different messages to be retransmitted to at least two different terminals.

A total size of messages to be retransmitted to one or more terminals of the group, means for example the total size of messages to be retransmitted (that is to say the sum of the total sizes of the messages to be retransmitted to each of the terminals of the group), the total size of the different messages to be retransmitted (regardless of whether they are to be retransmitted to different terminals or not), or the total size of the different messages which must be retransmitted to at least two different terminals.

"A capacity of broadcast channels planned by the access network" means for example a number of already planned broadcast channels, or else an amount of resources in the time domain and/or in the frequency domain available in planned broadcast channels.

In particular embodiments, the transmission method may also include one or more of the following features, taken in isolation or in any technically possible combination.

In particular embodiments, the broadcast retransmission criterion is considered to be verified when the access network has received several requests for retransmission of the same message, transmitted by a number of terminals of the group of terminals greater than a predetermined threshold value.

In particular embodiments, the broadcast retransmission criterion is considered to be verified when the access network has received several requests for retransmission of different messages, the total number and/or the total size of messages to be retransmitted being greater than a predetermined threshold value.

In particular embodiments, the broadcast retransmission criterion is considered to be verified when the access network has received several requests for retransmission of different messages, the number and/or the total size of messages to be retransmitted to at least two different terminals being greater than a predetermined threshold value.

In particular embodiments, the broadcast retransmission criterion is considered to be verified when the number of planned broadcast channels allows the retransmission of the message(s) to be retransmitted.

In particular embodiments, when a request for retransmission from a terminal has been received for several messages, the broadcast retransmission criterion is evaluated for each message to be retransmitted.

In particular embodiments, the transmission method includes transmitting, by the access network and when the message must be retransmitted over a broadcasting channel, a response to the terminal having transmitted the transmission request, said response including one or more parameters of the broadcast channel on which said message will be retransmitted.

In particular embodiments, the transmission method includes transmitting, by the access network and when the message must be retransmitted over a point-to-point link, a response to the terminal having transmitted the transmission request, said response including the message to be retransmitted.

According to a second aspect, the invention relates to an access network including a plurality of base stations adapted for exchanging messages with terminals, said access network being configured for:
- transmitting a message to a group of terminals over a broadcast channel,
- receiving a request for retransmission of said message transmitted by a terminal that has not correctly received said message,
- evaluating a predetermined broadcast retransmission criterion,
- when said broadcast retransmission criterion is verified: retransmitting the message over a broadcast channel to the group of terminals including said terminal having transmitted said request for retransmission of said message,
- when the broadcast retransmission criterion is not verified: retransmitting the message over a point-to-point link to said terminal having transmitted said request for retransmission.

The broadcast retransmission criterion is evaluated based on at least one of the following parameters:
- a number of messages to be retransmitted to one or more terminals of the group,
- a size of messages to be retransmitted to one or more terminals of the group,
- a capacity of broadcast channels planned by the access network.

BRIEF DESCRIPTION OF DRAWING

The invention will be better understood upon reading the following description, given by way of non-limiting example, and made with reference to the figures which represent.

In these figures, identical references from one figure to another designate identical or similar elements. For reasons of clarity, the items shown are not to scale, unless stated otherwise.

DETAILED DESCRIPTION OF EMBODIMENTS

Figure 1:
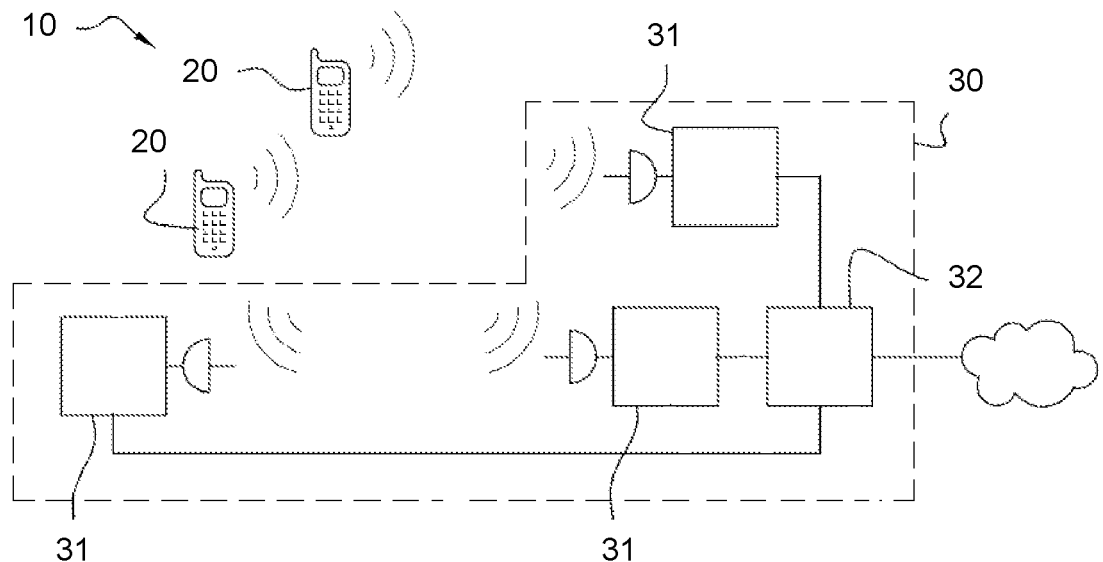
FIG. 1 is a schematic representation of a wireless communication system.

FIG. 1 schematically shows a wireless communication system 10 including several terminals 20 and an access network 30 including several base stations 31.

The terminals 20 and the base stations 31 of the access network 30 exchange messages in the form of radio signals. "Radioelectric signal" means an electromagnetic wave propagating via wireless means, the frequencies of which are included in the traditional spectrum of radio waves (a few hertz to several hundred gigahertz).

In the remainder of the description, the case of a wireless communication system of the LPWAN (acronym for "Low Power Wide Area Network") type is considered by way of example and without limitation. Such a wireless communication system is a low-power, long-range access network with data rates generally below 1 Mbps. Such LPWAN wireless communication systems are particularly adapted for IoT type applications.

In particular embodiments, the wireless communication system 10 may be an ultra-narrowband communication system. "Ultra Narrow Band" (or UNB), means that the instantaneous frequency spectrum of the radio signals transmitted from the terminals is of frequency width less than two kilohertz, or even less than one kilohertz. Such a system allows to significantly limit the power consumption of the terminals when they communicate with the access network.

The terminals 20 are adapted for transmitting messages over an uplink to the access network 30.

Each base station 31 is adapted to receive the messages transmitted by terminals 20 which are within its range. Each message thus received is for example transmitted to a server 32 of the access network 30, optionally accompanied by other information such as an identifier of the base station 31 which received it, the measured power of said received message, the date of reception and/or the measured central frequency of said received message, etc. The server 32 processes, for example, all the messages received from the various base stations 31.

Furthermore, the access network 30 is also adapted for transmitting, via the base stations 31, messages on a downlink to the terminals 20, which are adapted for receiving them. A message can be transmitted on the downlink over a point-to-point link, that is to say to a single specific terminal 20, indicated as recipient in the message. A message can also be transmitted over a broadcast channel to a group of terminals 20, identified by a group identifier indicated as recipient in the message. The broadcast channel may be a global broadcast channel, in which case the group of terminals 20 corresponds to all the terminals 20 of the wireless communication system 10. The broadcast channel may be a multicast channel, in which case the terminal group 20 corresponds to only a part of all the terminals 20 of the wireless communication system 10.

Figure 2:
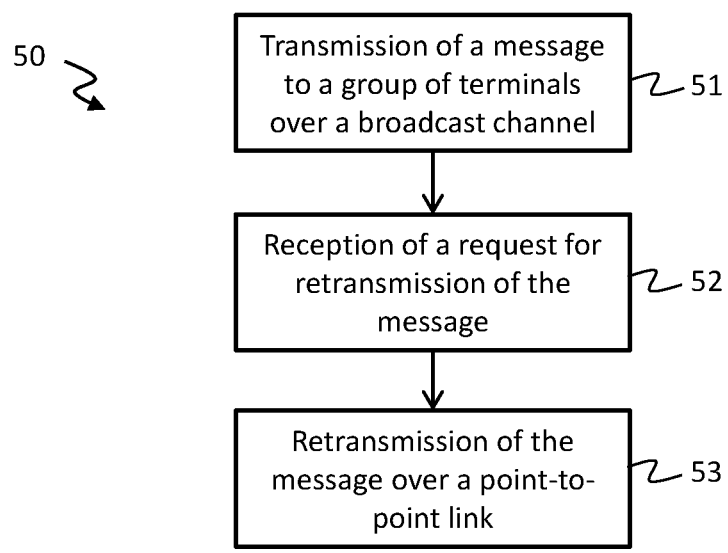
FIG. 2 is a diagram illustrating the main steps of a method for transmitting messages by an access network.

FIG. 2 shows the main steps of a method 50 for transmitting, by an access network 30, a message to a group of terminals, which are:
- a step 51 of transmitting, by the access network 30, at least one message to the group of terminals 20 over a broadcasting channel,
- a step 52 of receiving, by said access network 30, a request for retransmission of said message transmitted by a terminal 20 not having correctly received said message,
- a step 53 of retransmitting, by said access network 30, said message over a point-to-point link to the terminal 20.

Thus, the transmission method 50, in a context of transmitting a message to a group of terminals 20 over a broadcasting channel, allows to carry out the retransmission of a message not correctly received by a terminal 20 over a point-to-point link to said terminal 20.

It should be noted that the various steps illustrated in FIG. 2 are performed by the access network 30, in this case by at least one base station 31 of the access network 30, and optionally by the server 32.

In the remainder of the description, it is considered that the case where the steps of the transmission method 50 are performed by the base stations 31 of the access network 30 in a non-limiting manner.

To this end, each base station 31 includes for example a processing circuit (not shown in the figures), including for example one or more processors and storage means (magnetic hard disk, electronic memory, optical disk, etc.) wherein a computer program product is stored, in the form of a set of program code instructions to be executed to implement the steps of the transmission method 50. Alternatively or in addition, the processing circuit includes one or more programmable logic circuits (FPGA, PLD, etc.), and/or one or more specialised integrated circuits (ASIC), and/or a set of discrete electronic components, etc., adapted for implementing all or part of said steps.

Each base station 31 further includes a radio circuit (not shown in the figures) including equipment (antenna, amplifier, local oscillator, mixer, analogue filter, etc.) known to the person skilled in the art, allowing said base station 31 to transmit and receive messages in the form of radio signals.

In other words, the processing circuit and the radio circuit correspond to means of the access network 30 which are software (specific computer program product) and/or hardware (FPGA, PLD, ASIC, discrete electronic components, etc.) configured to implement the steps of the transmission method 50.

Figure 3:
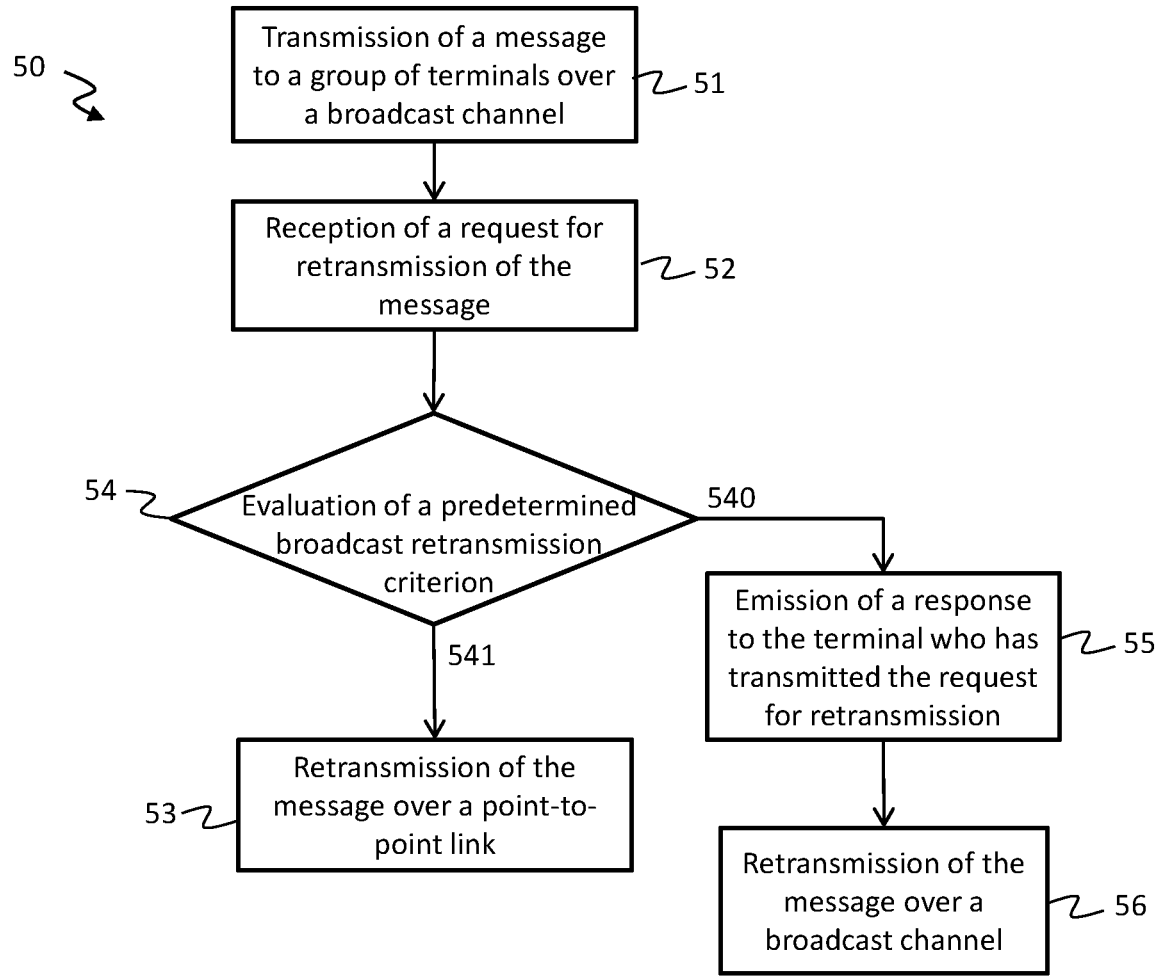
FIG. 3 is a diagram illustrating the main steps of a preferred embodiment of a method for transmitting messages over an access network.

FIG. 3 schematically shows the main steps of a preferred embodiment of the transmission method 50. As illustrated in FIG. 3, the transmission method 50 repeats all the steps of FIG. 2.

As illustrated by FIG. 3, the transmission method 50 further includes, when the access network 30 receives a request for retransmission of a message transmitted by a terminal 20: a step 54 of evaluating, by the access network 30, a predetermined broadcast retransmission criterion.

When said broadcast retransmission criterion is verified (reference 540 in FIG. 3), the transmission method 50 includes a step 56 of retransmitting the message, by the access network 30, over a broadcast channel to the group of terminals 20 including said terminal 20 having transmitted said request for retransmission of said message.

When the broadcast retransmission criterion is not verified (reference 541 in FIG. 3), the transmission method 50 includes the step 53 of retransmitting the message over a point-to-point link, discussed above with reference to FIG. 2.

Thus, in the preferred embodiment illustrated by FIG. 3, the access network 30 determines, based on a broadcast retransmission criterion, whether a message indicated in a request for retransmission must be transmitted over a broadcast channel or over a point-to-point link. Therefore, by evaluating the broadcast retransmission criterion, the access network 30 may favour retransmission over a broadcast channel in some scenarios, and favour retransmission over a point-to-point link in other scenarios.

In preferred embodiments, the broadcast retransmission criterion is evaluated based on at least one of the following parameters:
  number of terminals having transmitted a request for retransmission of one or more messages,
  number of messages to be retransmitted to one or more terminals of the group,
  total size of messages to be retransmitted to one or more terminals of the group,
  space available in broadcast channels planned by the access network.

According to a first example, the broadcast retransmission criterion is considered to be verified when the access network 30 has received several requests for retransmission of the same message, transmitted by a number of different terminals 20 of the group of terminals 20 which is greater than a predetermined positive threshold value, preferably greater than two (2), or even greater than ten (10). Thus, if a single terminal 20 has requested the retransmission of a given message, said message is retransmitted over a point-to-point link. If a large number of terminals 20 has required the retransmission of the same message, said message is advantageously retransmitted over a broadcasting channel, in particular in order to limit the temporal occupation of the frequency band used for the transmission of messages on the downlink, to limit the duration of reception unavailability of the base station 31 which retransmits the message when said base station 31 is of the half-duplex type, etc.

According to a second example, which can be considered in combination with the previous example, the broadcast retransmission criterion is considered to be verified when the access network 30 has received several requests for retransmission of different messages, transmitted by one or more terminals 20 of the group, the number and/or the total size of messages to be retransmitted being greater than a predetermined positive threshold value. Thus, if the access network 30 has to retransmit a single message, said message is retransmitted over a point-to-point link. If a large number of messages must be retransmitted, and/or if the total size of messages to be retransmitted is large, said messages are advantageously retransmitted over a broadcast channel, in particular in order to limit the temporal occupation of the frequency band used for the transmission of messages on the downlink, to limit the duration of reception unavailability of the base station 31 which retransmits the message when said base station 31 is of the half-duplex type, etc.

It should be noted that the retransmission criterion can be based on the total number of messages to be retransmitted (that is to say the sum of the numbers of messages to be retransmitted to each of the terminals of the group). However, the retransmission criterion can also be based on the number of different messages to be retransmitted (regardless of whether they are to be retransmitted to different terminals or not). Advantageously, the retransmission criterion can also be based on the number of different messages to be retransmitted to at least two different terminals. Indeed, the advantage of retransmitting by a broadcast channel will be greater in a scenario where a set of messages must be retransmitted for which each message must be retransmitted to several different terminals, compared to a scenario where a set of messages must be retransmitted for which each message should only be retransmitted to a single terminal.

Similarly, it should be noted that the retransmission criterion may be based on the total size of messages to be retransmitted (that is to say the sum of the total sizes of the messages to be retransmitted to each of the terminals of the group), or on the total size of the different messages to be retransmitted (regardless of whether they are to be retransmitted to different terminals or not), or else on the total size of the different messages which must be retransmitted to at least two different terminals.

According to a third example, which can be considered in combination with the previous example, the broadcast retransmission criterion is considered to be verified when the space available in one or more planned broadcast channels allows the retransmission of the message(s) to be retransmitted. In other words, the broadcast retransmission criterion is considered to be verified when the broadcast channels already planned have sufficient capacity (for example in terms of resources in the time and/or frequency domain, or in terms of the number of planned broadcast channels). Indeed, if one or more broadcast channels are planned and if the available space is sufficient to retransmit the messages for which the access network 30 has received requests for retransmission, then it is advantageous to perform the retransmission by broadcast, since the terminals 20 must listen to the planned broadcast channel(s). If the available space is sufficient to retransmit only part of said messages, it is also possible to retransmit this part of the messages on the planned broadcast channel(s), and to retransmit the other messages on one or more point-to-point links.

Note that it is also possible to consider other parameters for the evaluation of the broadcast retransmission criterion. Furthermore, the choice of a particular criterion for broadcast retransmission constitutes only an alternative embodiment of the invention.

In particular embodiments, when the message is to be retransmitted over a point-to-point link (reference 541 in FIG. 3), the message is retransmitted in response to the request for retransmission, over a point-to-point link to the terminal 20 having transmitted said request for retransmission. The response in this case includes the specific identifier of the terminal 20 as the recipient of said response, as well as the message to be retransmitted. Said response may also include, for example, the group identifier of the group of terminals 20, which is not used to identify the recipient of said response (since said response is transmitted over a point-to-point link) but to identify the message flow to which the retransmitted message belongs. Said response may also include, for example, an identifier of the retransmitted message, which may for example be in the form of a sequence number of said message, representative of the rank of said message in the sequence of messages transmitted to the group of terminals 20.

It should however be noted that the message to be retransmitted can also be transmitted subsequently, in a subsequent communication over a point-to-point link to said terminal. If necessary, the access network 30 can transmit, over a point-to-point link, a response to the request for retransmission. This response may for example include, in addition to the specific identifier of said terminal 20 as recipient of said response, one or more parameters of the subsequent communication, such as for example the frequency on which the subsequent communication will be transmitted, the instant at which the subsequent communication will be transmitted, etc. For its part, the subsequent communication may also include, in addition to the message to be retransmitted, the group identifier of the group of terminals 20 as the identifier of the message flow to which the retransmitted message belongs, the identifier of the message retransmitted within said message flow, etc.

In particular embodiments, as illustrated by FIG. 3, the transmission method 50 may include, when the message must be retransmitted over a broadcast channel (reference 540 in FIG. 3), a step 55 of transmitting, by the access network 30, a response to the terminal 20 having transmitted the transmission request. Preferably, said response is transmitted over a point-to-point link to said terminal 20. In particular embodiments, said response may include one or more parameters of the broadcast channel on which said message will be retransmitted, such as for example the frequency on which the broadcast channel will be transmitted by the access network 30, the instant at which said broadcast channel will be transmitted by the access network 30, etc.

The invention claimed is:

1. A method for transmitting a message by an access network from a wireless communication system to a group of terminals, comprising:
   transmitting, by the access network, at least one message to a group of terminals over a broadcast channel;
   receiving, by the access network, a request for retransmission of said at least one message transmitted from a terminal that has not correctly received said at least one message;
   evaluating, by the access network, a predetermined broadcast retransmission criterion;
   when the predetermined broadcast retransmission criterion is verified: retransmitting said at least one message, by the access network, over the broadcast channel to the group of terminals including the terminal requesting retransmission of said at least one message;
   when the predetermined broadcast retransmission criterion is not verified: retransmitting said at least one message, by the access network, over a point-to-point link to the terminal requesting retransmission of said at least one message; and
   wherein the predetermined broadcast retransmission criterion is evaluated based on at least one of the following parameters:
   a number of messages to be retransmitted to one or more terminals of the group;
   a total size of the messages to be retransmitted to one or more terminals of the group; and
   a capacity of broadcast channels planned by the access network.

2. The method of claim 1, wherein the predetermined broadcast retransmission criterion is considered to be verified for at least one of the following events: the access network has received several requests for retransmission of different messages, a total number and the total size of messages to be retransmitted is greater than a predetermined threshold value.

3. The method of claim 1, wherein the predetermined broadcast retransmission criterion is considered to be verified for at least one of the following events: the access network has received several requests for retransmission of different messages, a number and the total size of messages to be retransmitted to at least two different terminals of the group is greater than a predetermined threshold value.

4. The method of claim 1, wherein the predetermined broadcast retransmission criterion is considered to be verified when a number of planned broadcast channels allows the retransmission of said at least one message to be retransmitted.

5. The method of claim 1, further comprising transmitting, by the access network, a response to the terminal requesting retransmission when said at least one message is retransmitted over the broadcast channel, the response comprising one or more parameters of the broadcast channel on which said at least one message will be retransmitted.

6. The method of claim 1, further comprising transmitting, by the access network, a response over the point-to-point link to the terminal requesting retransmission when said at least one message is retransmitted over the point-to-point link, said response comprising said at least one message to be retransmitted.

7. The method of claim 1, wherein the predetermined broadcast retransmission criterion is evaluated for each message to be retransmitted when the request for retransmission from the terminal is for several messages.

8. An access network for a wireless communication system comprising a plurality of base stations configured to exchange messages with terminals, the access network being configured to:
- transmit at least one message to a group of terminals over a broadcast channel;
- receive a request for retransmission of said at least one message transmitted from a terminal that has not correctly received said at least one message;
- evaluate a predetermined broadcast retransmission criterion;
- when the predetermined broadcast retransmission criterion is verified: retransmit said at least one message over the broadcast channel to the group of terminals including the terminal requesting retransmission of said at least one message,
- when the predetermined broadcast retransmission criterion is not verified: retransmitting said at least one message over a point-to-point link to the terminal requesting retransmission of said at least one message; and
- wherein the predetermined broadcast retransmission criterion is evaluated based on at least one of the following parameters:
- a number of messages to be retransmitted to one or more terminals of the group;
- a total size of messages to be retransmitted to one or more terminals of the group; and
- a capacity of broadcast channels planned by the access network.

* * * * *